June 28, 1938.  F. SACKER  2,121,828

ANIMAL RESTRAINER

Filed Dec. 19, 1936    2 Sheets-Sheet 1

Inventor

Frank Sacker

By Clarence A. O'Brien
Hyman Berman
Attorneys

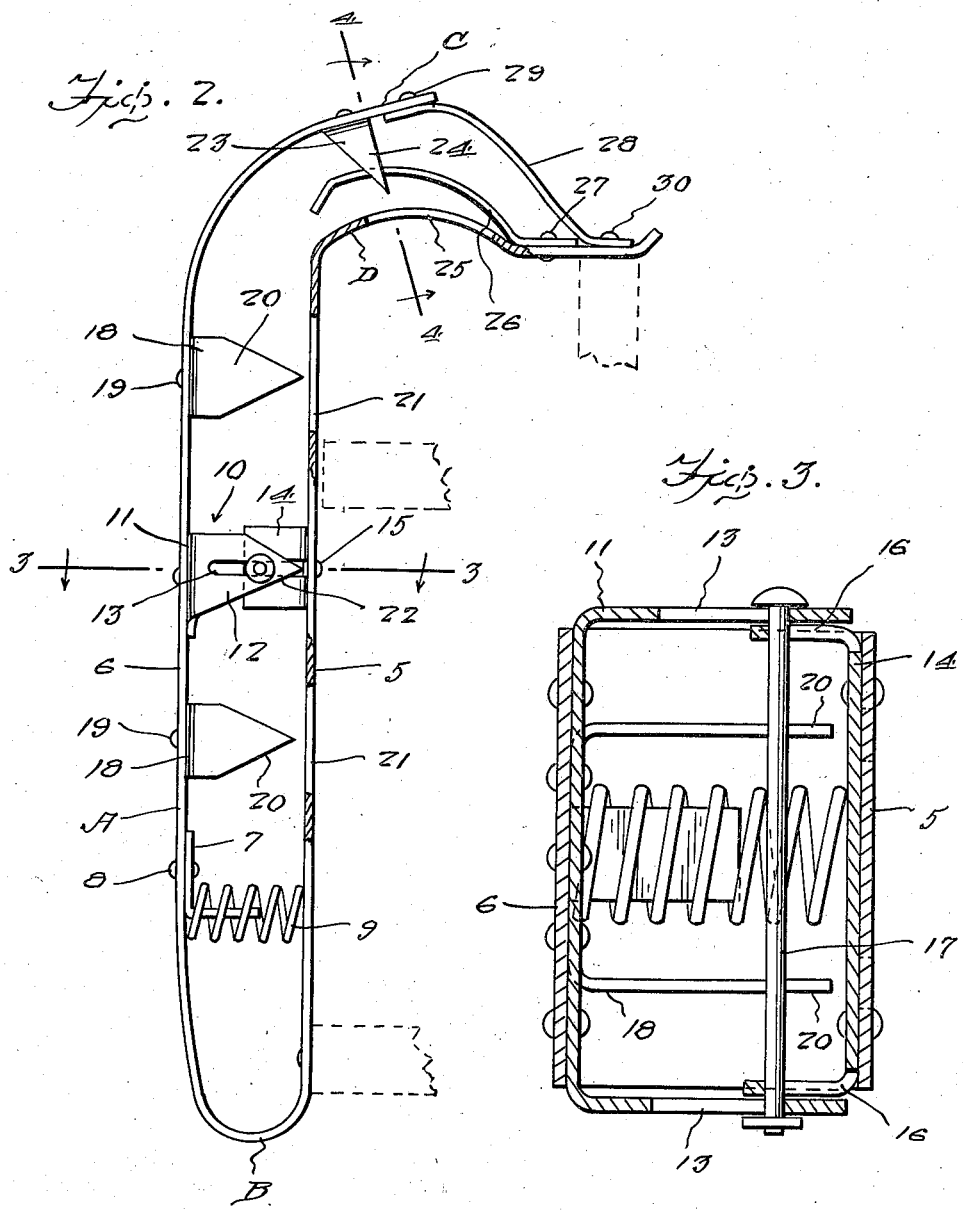

Patented June 28, 1938

2,121,828

UNITED STATES PATENT OFFICE 2,121,828

ANIMAL RESTRAINER

Frank Sacker, Monroe, Wis., assignor of seventy-five percent to Adam Marty and twenty-five percent to H. J. Lamboley, both of Monroe, Wis.

Application December 19, 1936, Serial No. 116,788

1 Claim. (Cl. 119—142)

This invention pertains to new and useful improvements in means for restraining stock from efforts to get through fences and other barriers.

A principal object of the present invention is to provide an animal restraint especially adapted for cattle and the like and which is mounted on the head of the stock so that in the event he tries to get through fences or other barriers the device will function to stop him.

Another important object of the invention is to provide a device of this character which will be simple in construction, easy to manufacture and which will not be susceptible to the ready development of defects.

The present invention is an improvement on my Patent Number 2,040,410, issued May 12, 1936.

In the drawings:

Figure 2 represents a side elevational view of the device with parts in section.

Figure 3 is a cross sectional view on line 3—3 of Fig. 2.

Figure 1:
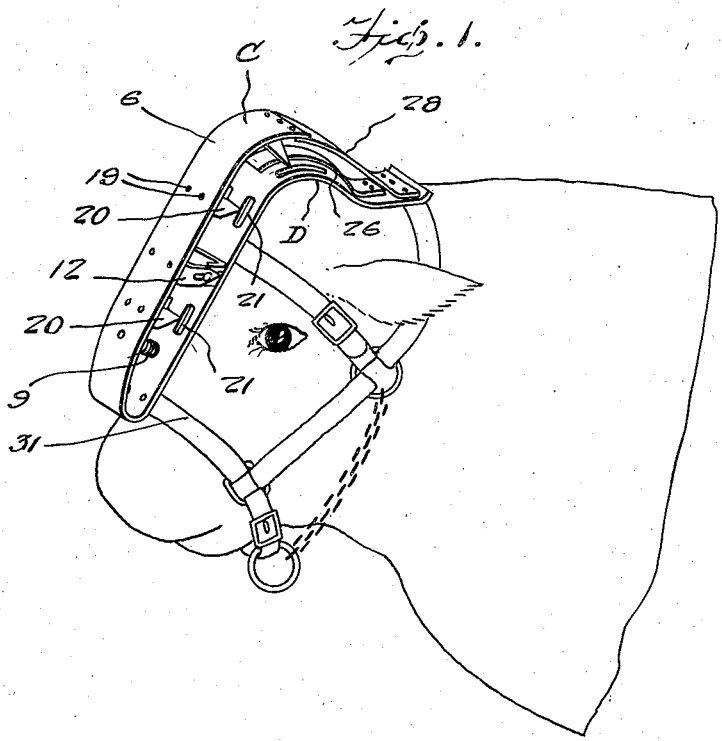
Figure 1 represents a perspective view of the device mounted on the head of a stock.
Figure 4:
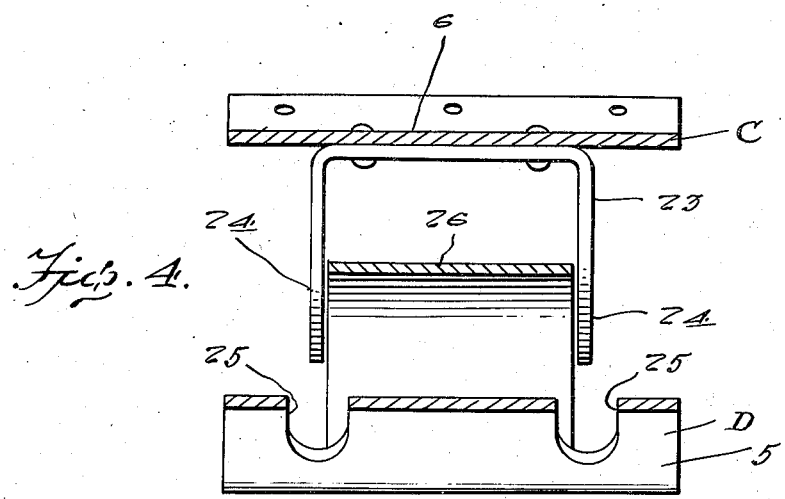
Figure 4 is a cross sectional view on line 4—4 of Fig. 2.

Referring to the drawings wherein like numerals designate like parts it can be seen that the device consists of an elongated strap A of spring metal which is bent at its intermediate point B to divide the strap into the back section 5 and front section 6.

An L-shaped bracket member 7 is secured by a rivet 8 to the lower portion of the front section 6 and is engaged into the convolutions of a coiled compressible spring 9 which has its end convolutions bearing against the inner sides of the rear and front walls 5—6 as is clearly shown in Fig. 2.

A guide unit is generally referred to by numeral 10 and consists of the U-shaped member 11 having the pointed leg portions 12 each slotted as at 13. A U-shaped bracket 14 is secured by rivets 15 to the inner side of the rear wall 5 and the leg portions of this bracket 14 are slotted as at 16. A pin 17 is disposed through the slots 13 and 16 of the members 11-14. The front wall 6 is supported with a pair of U-shaped members 18—18 one above and one below the member 11 and these are secured to the walls 6 by rivets 19. The leg portions of these members 18—18 are sharpened to provide prongs 20 which are disposable through the slot 21 in the rear wall 5 when the slot section 6 is urged toward the rear section 5 as when the animal comes in contact with a fence or obstacle. The rear wall 5 is also provided with slots to accommodate the prongs 22 of the member 11 and a slotted prong member 22 is provided on the inside of the rearwardly curved upper end portion C of the front wall 6. This member 23 is also U-shaped and has its leg portion sharpened to provide prongs 24 which are disposable through slot 25 in the rearwardly curved portion D of the rear wall 5. A strip spring 26 has one end anchored to the rearwardly projecting portion D of the rear wall 5 as at 27, the free end portion of this spring 26 is disposed under the rearward portion C of the front wall 6 so as to limit downward movement of the portion C. A flexible strap of leather or some other similar material 28 is riveted at one end at at 29 to the end portion C while it is opposite and lower end portions riveted as at 30 to the rear end of the portion D.

Strap members 31 are provided for securing the restraining device to the animal's head as in the manner substantially shown in Figure 1.

While the forgoing specification set forth the invention in specific terms, it is to be understood that numerous changes in the shape, size and materials may be resorted to without departing from the spirit and scope of the invention as claimed hereinafter.

What is claimed is:

A restraining device of the character described comprising an elongated strip spring substantially to provide parallel spaced front and rear portions, the front portion being provided with rearwardly extending prong members, the rear portion being provided with slots through which the said prong members can project when the front portion is urged toward the rear portion, the ends of the front and rear portions extending upwardly and curved rearwardly the end of the rear portion extending beyond the end of the front portion a flexible strap connection between the free end thereof, and a strip spring and buffer secured at one end to the upper end portion of the rear portion and projecting toward the front portion end of back and being normally spaced from the front portion, said spring being positioned between a pair of the prongs to guide the prongs to said slots.

FRANK SACKER.